United States Patent
Johnson et al.

(10) Patent No.: US 6,290,183 B1
(45) Date of Patent: Sep. 18, 2001

(54) THREE-AXIS, SIX DEGREE-OF-FREEDOM, WHOLE-SPACECRAFT PASSIVE VIBRATION ISOLATION SYSTEM

(75) Inventors: Conor D. Johnson, Belmont; Paul S. Wilke, San Jose; Scott C. Pendleton, Foster City, all of CA (US)

(73) Assignee: CSA Engineering, Inc., Mountain View, CA (US)

( * ) Notice: Subject to any disclaimer, the term of this patent is extended or adjusted under 35 U.S.C. 154(b) by 0 days.

(21) Appl. No.: 09/420,843

(22) Filed: Oct. 19, 1999

(51) Int. Cl.$^7$ .................................................. B64G 1/38

(52) U.S. Cl. ............................ 244/170; 267/164; 248/557

(58) Field of Search ................................ 244/170, 158 R, 244/17.27, 131; 248/557, 609, 635, 638; 267/164, 160, 30, 136

(56) References Cited

U.S. PATENT DOCUMENTS

| | | |
|---|---|---|
| 3,517,897 | 6/1970 | Wells . |
| 3,663,002 | 5/1972 | Gergle et al. . |
| 3,821,859 | * 7/1974 | McWatters . |
| 4,111,386 | 9/1978 | Kenigsberg et al. . |
| 4,362,281 | 12/1982 | Cresap et al. . |
| 4,682,744 | 7/1987 | Grounder . |
| 4,715,565 | * 12/1987 | Whittmann . |

(List continued on next page.)

FOREIGN PATENT DOCUMENTS

| | | |
|---|---|---|
| 822350 | 10/1959 | (GB) . |
| 945860 | 1/1964 | (GB) . |

OTHER PUBLICATIONS

Fosness, Eugene R. et al., "Launch Vibration Isolation System," Engineering Mechanics Proceedings of the 11th Conference, vol. 1, pp. 228–231, Fort Lauderdale, FL., May 19–22, 1996.

Fosness, Eugene R. et al., "Passive Isolation Systems for Launch Vehicles," Engineering Contruction, and Operations in Space V, Proceedings of the Fifth International Conference on Space '96, vol. 2, pp. 1176–1182, Albuquerque, NM., Jun. 1–6, 1996.

Wilke Paul S. et al., "Payload isolation system for launch vehicles," SPIE Conference, Mar. 1997, San Diego, CA.

Wilke Paul S. et al., "Whole–Spacecraft Passive Launch Isolation," Adapted Structures Forum, Apr. 7–10, 1997, Kissimmee, FL.

D.L. Edberg et al. "On the Design and Testing of a Spacecraft Launch Vibration Isolation System(LVIS)," American Institute of Aeronautics and Astronautics, ©1997, pp. 1494–1499.

Ozisk, Hakan and Rubin, Sheldon, "Soft Ride for Spacecraft," Spacecraft & Launch Vehicle Dynamic Environments TIM, Marshal Space Flight Center, Huntsville, Alabama, Sep. 110–1996.

*Primary Examiner*—Charles T. Jordan
*Assistant Examiner*—Tien Dinh
(74) *Attorney, Agent, or Firm*—James Creighton Wray; Meera P. Narasimhan

(57) ABSTRACT

The excitations from the engines of launch vehicles and the aerodynamics of flight produce large vibrations which are highly detrimental to spacecraft during launch. Significant dynamic loads often exist in all three translations and for rotations as well, therefore, complete six degree-of-freedom vibration load isolation is often desired. The disclosed device utilizes a previously disclosed passive axial vibration isolation device to simply and effectively create a passive three-axis vibration isolation device suitable for effecting a six degree-of-freedom whole-spacecraft passive vibration isolation system. The vibration isolation system design can be simply tuned to address various dynamic load frequency bands of concern, including isolation for pyrotechnic shock. The resulting system is compact and lightweight and can be easily utilized with existing launch vehicle-to-payload support structures.

21 Claims, 5 Drawing Sheets

U.S. PATENT DOCUMENTS

| | | |
|---|---|---|
| 4,725,046 | 2/1988 | Sugino . |
| 5,199,672 | 4/1993 | King et al. . |
| 5,217,198 * | 6/1993 | Samarov et al. . |
| 5,232,073 | 8/1993 | Bronowicki et al. . |
| 5,244,170 | 9/1993 | Shekher . |
| 5,280,890 * | 1/1994 | Wydra . |
| 5,310,276 | 5/1994 | Bergers et al. . |
| 5,358,210 | 10/1994 | Simon et al. . |
| 5,411,226 | 5/1995 | Jones et al. . |
| 5,476,704 * | 12/1995 | Kohler . |
| 5,641,133 | 6/1997 | Toossi . |

\* cited by examiner

THREE-AXIS, SIX DEGREE-OF-FREEDOM, WHOLE-SPACECRAFT PASSIVE VIBRATION ISOLATION SYSTEM

REFERENCED PATENT APPLICATIONS

This application references and incorporates herein, in its entirety, patent application Ser. No. 08/980,790.

BACKGROUND OF THE INVENTION

To reduce the dynamic loads transmitted to a spacecraft by its launch vehicle during launch, a vibration isolation system is desired which isolates and serves as the mounting system for the spacecraft to the launch vehicle. However, owners of spacecraft that cost tens to hundreds of millions of dollars demand a high strength, high fatigue-life connection between the spacecraft and the launch vehicle. This connection must provide a fail-safe connection; must be able to handle, without stress failure, the deflections due to the sum of the quasi-static acceleration loads of the spacecraft due to maneuvering and other vehicle loading events, and the dynamic loads of the isolation system; must be completely linear in all deflection regions (both tension and compression); and must be of minimal height and minimal weight. The isolation system must also not introduce collateral problems with the launch, such as low frequency modes, interaction with the launch vehicle control system, or reduction of payload-fairing clearance. The isolation system must be easily tunable for different combinations of launch vehicles and spacecraft, and readily employable in existing spacecraft because of the importance of flight heritage. Vibration isolation systems which provide isolation for all three translation axes are required where significant vibration loads exist in each of the axes. Particular to spacecraft, lateral dynamic loads during launch may often be as critical to the payload spacecraft as the vehicle longitudinal dynamic loads.

This invention is a device which simply and compactly provides passive vibration isolation in all three translation axes. When multiple devices are properly sized and configured together, a whole-spacecraft passive vibration isolation system with six degree-of-freedom passive vibration isolation is created. This system particularly provides a means for substantially reducing all the translational and rotational components of vibration transmitted to spacecraft from their launch vehicles during the launch process. By varying the size and spacing of the individual devices, the system can be easily tuned to suppress vibration loads at low or high frequencies. The system is also effective for substantial attenuation of shock loads. The benefits afforded the spacecraft and its components include reduced structural weight and cost, as well as increased life and reliability.

Historically, the connection between the spacecraft and the launch vehicle has been made with a very stiff structure. That type is generally considered to be a "hard mount" and is extremely efficient at transmitting all structure-borne forces from the launch vehicle to the spacecraft over a very wide frequency band. A need exists for isolating the payload of a launch vehicle from all structure-borne vibration loads; those due to launch, maneuvering, thrust termination and staging, as well as periodic thrust oscillations, pyrotechnic separation systems and aerodynamic loading.

Vibration isolation systems work by connecting the isolated structure (payload) to the base structure by means of a resilient mount or mounts. Damping is required in the resilient mounts to reduce the amplitude of response of the payload at the isolation frequency when the system is under external excitation at the isolation frequency. The resilient mounts must also allow sufficient relative motion between the vibrating base structure and the payload, which is referred to as the isolator stroke, or sometimes referred to as the "rattle space."

Because the spacecraft is a major structural component of the launch vehicle/spacecraft dynamic system, variations in the isolation frequencies greatly effect the dynamics of the launch vehicle/spacecraft system. Any unpredicted changes in the dynamics can have an adverse effect on the control system of the launch vehicle and cause instability and thereby loss of the mission. Therefore, the stiffness properties of the isolation system must be accurately predicted and accounted for throughout the entire flight. The simplest and most effective way of achieving this predictable isolation system performance is by having a linear isolation system under all load cases, including launch vehicle acceleration loads, which typically range from −2 g's to +6 g's and higher. Resilient mounts commonly use a soft, non-linear material, such as an elastomeric, as their stiffness component. However, because of their non-linearity, elastomerics (rubbers, etc.) exhibit different stiffness under various loads, temperatures, and frequencies, resulting in complexity and unpredictability in performance, and therefore they cannot effectively be used as the stiffness component of a whole-spacecraft passive vibration isolation system. Also, under very high static loads, elastomerics creep (deflect as a function of time), and this cannot be tolerated. The use of elastomeric material as the stiffness component has been due to its heretofore advantage in tolerating strains up to 50%, which has allowed the elastomeric isolation mount to provide the necessary isolator stroke.

Three-axis whole-spacecraft vibration isolation design has eluded previous attempts. The disclosed invention, which is elegant and simple, satisfies all of these requirements.

SUMMARY OF THE INVENTION

The invention described within is a three-axis vibration isolation device effective for implementing a whole-spacecraft passive vibration isolation system providing substantial vibration load isolation in all three axes of any orthogonal coordinate system. The present invention incorporates the axial vibration isolation device of application Ser. No. 08/980,790 in multiplicity in a manner that produces a three-axis vibration isolation device that is suitable for three-axis whole-spacecraft vibration isolation.

A whole-spacecraft passive isolation system, to be effective and practical, must provide substantial isolation of the payload spacecraft from high frequency dynamic loads while simultaneously supporting the spacecraft under high G quasi-static acceleration loads with minimal movement of the payload spacecraft relative to the launch vehicle structure. A three-axis whole-spacecraft passive isolation system must satisfy these needs in all load directions. The device described does these things and retains the substantial improvements in dynamic load isolation, fatigue-life performance, and linear load-vs.deflection behavior achieved with the axial passive vibration isolation device referenced in application Ser. No. 08/980,790. The three-axis device is also very compactly configured so that it may be simply and straightforwardly employed in presently fabricated hardmount spacecraft support structures.

The three-axis isolation device disclosed achieves these qualities and improvements over other vibration isolation devices by capitalizing on the linear stiffness, and high strength of the axial vibration isolation device, as well as its substantially stiffness-independent damping characteristic. The flexure element of one axial device is connected to the flexure element of a second axial device in such a way as to create a predictable and linear lateral compliance within the new assembly. A stand-off post of high strength, linear-elastic material is moment connected to one of the flexure beams of the axial flexure element by way of the device mount located on that flexure beam. An axial device is thus connected at each end of the stand-off post thereby creating an assembly of two axial devices serially and moment connected by the stand-off post. The axial stiffness of the assembly is governed by the two axial devices connected serially, and is substantially determined by the simple transverse load, fixed-end bending stiffness of the flexure beams of the individual axial devices. The lateral stiffness of the assembly, however, is largely determined by the torsional stiffness of the flexure beams and also by the local moment bending stiffness of the flexure beams. Since the two axial devices are moment connected to one another by way of the stand-off post, a substantial but predictable and linear lateral compliance is established within the assembly. The assembly effectively takes advantage of additional but inherent compliances within the axial device to create a three-axis compliant flexure. The damping and constraining layers present in the axial devices are effective for damping the lateral motions as well as for the longitudinal motion, thus enabling an effective three-axis, passively-damped vibration isolation device.

As with the axial device, the three-axis device disclosed gains the advantage of linear behavior and long fatigue-life by passing the load through high strength, linear elastic material over the complete length of the flexure's load path. The required damping of the isolation device is gained by the viscoelastic layers which remain in a relatively minor and parallel load path sense.

As with the system using the axial isolation devices, the three-axis whole spacecraft isolation system provides the only structural connection between the spacecraft and the launch vehicle. It must therefore be capable of handling the high launch loads while providing a high degree of reliability and predictability. All six degrees of motion of the spacecraft, that is the three translations and the three rotations, are dependent upon the isolation system, therefore vehicle lateral modes as well as longitudinal modes will be effected. Pitch, yaw, and roll modes of the spacecraft will also be effected. The linearity of the three-axis whole-spacecraft isolation system makes the system design effort relatively straight forward compared to the inherently non-linear elastomeric type isolation systems. Higher reliability is gained by using high strength materials, such as titanium, through the complete load path.

Other advantages for the disclosed implementations include that the system is passive (no electronics or controls required), it is easy to implement in a variety of existing spacecraft adapters, and it is relatively lightweight.

DETAILED DESCRIPTION OF THE PREFERRED EMBODIMENTS

Figure 1:
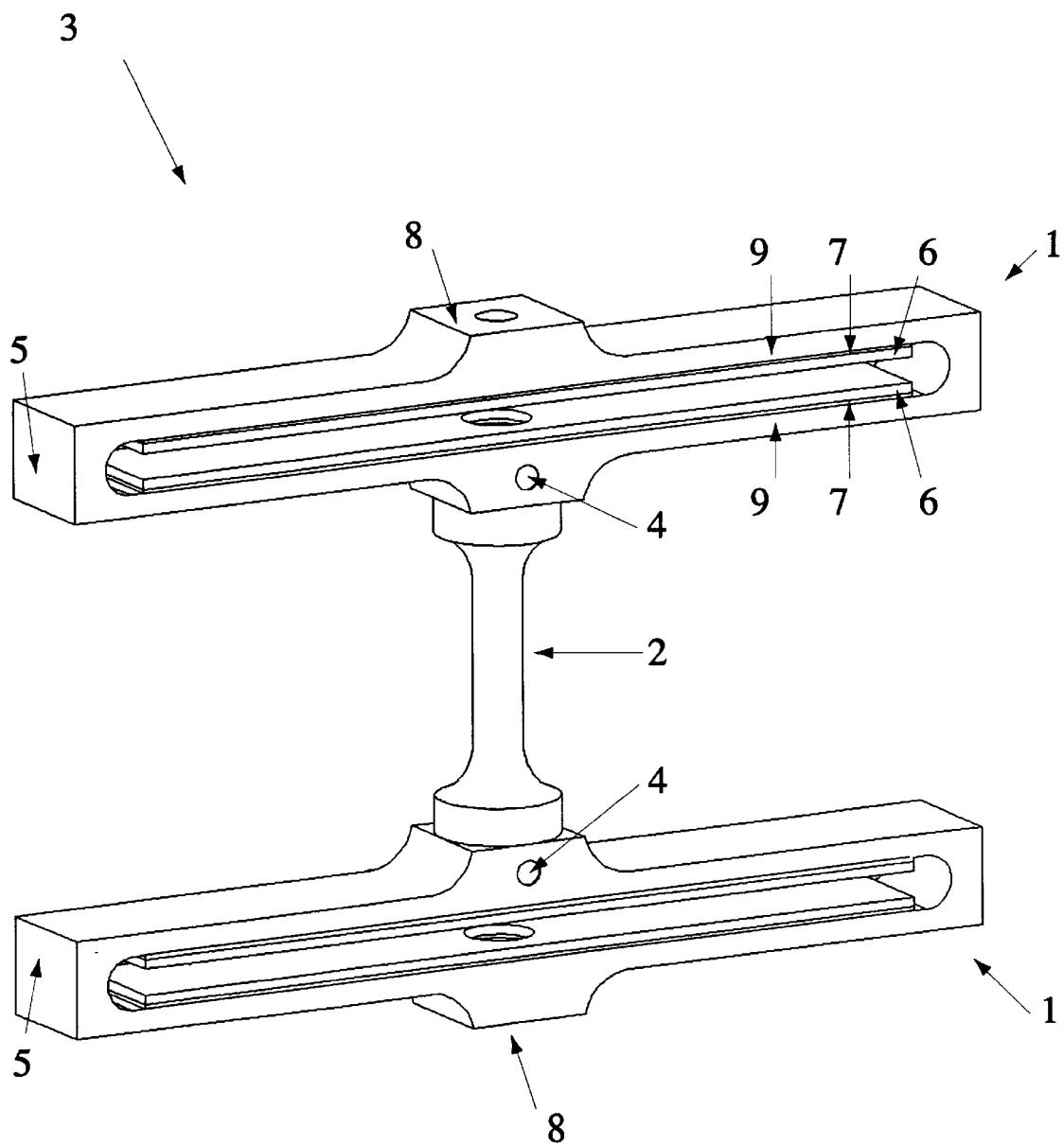
FIG. 1 is an isometric assembly view of the three-axis vibration isolation device utilizing the dual-beam type axial vibration isolation device.
Figure 2:
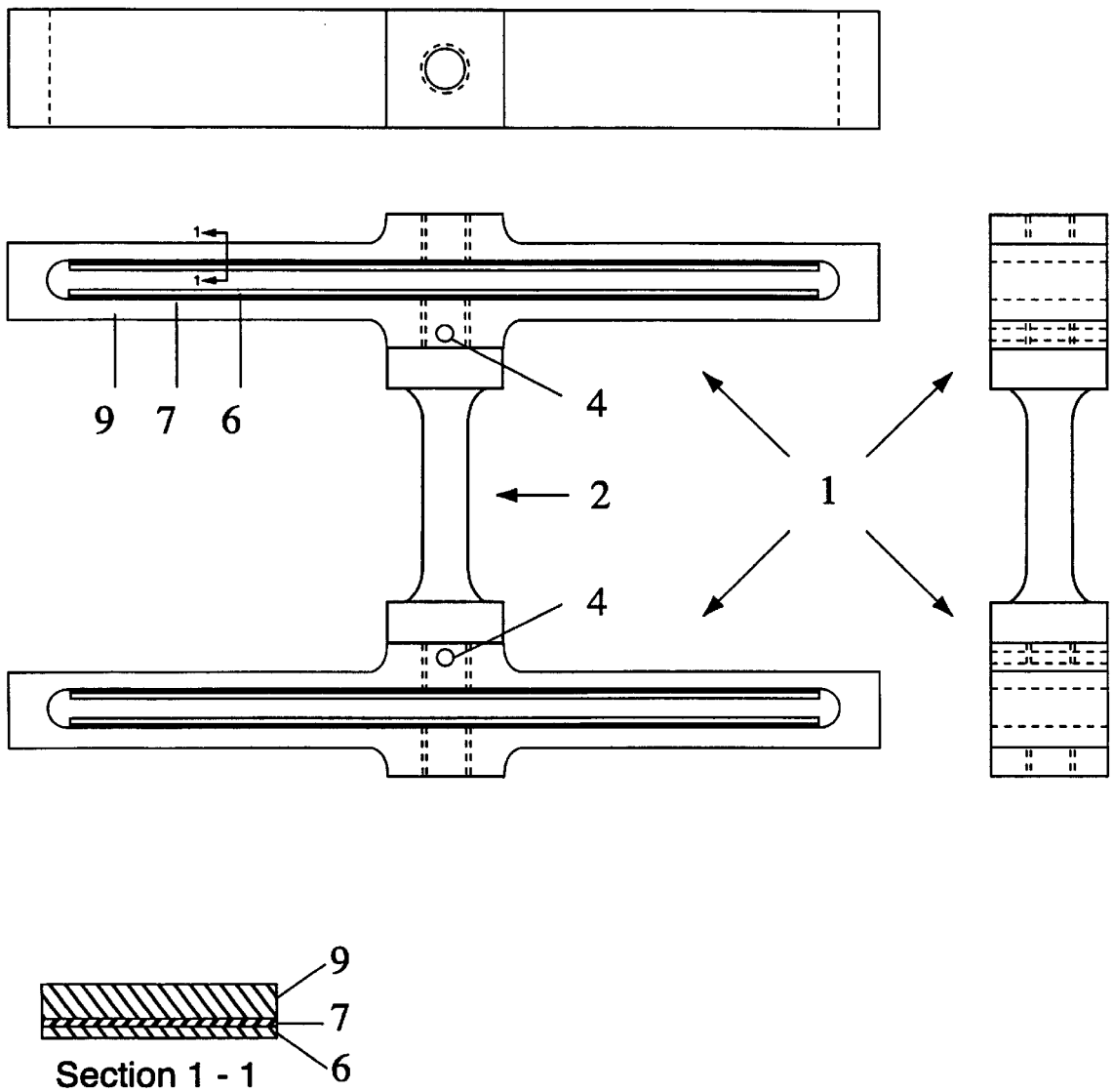
FIG. 2 is orthogonal views of the three-axis vibration isolation device of FIG. 1.
Figure 5:
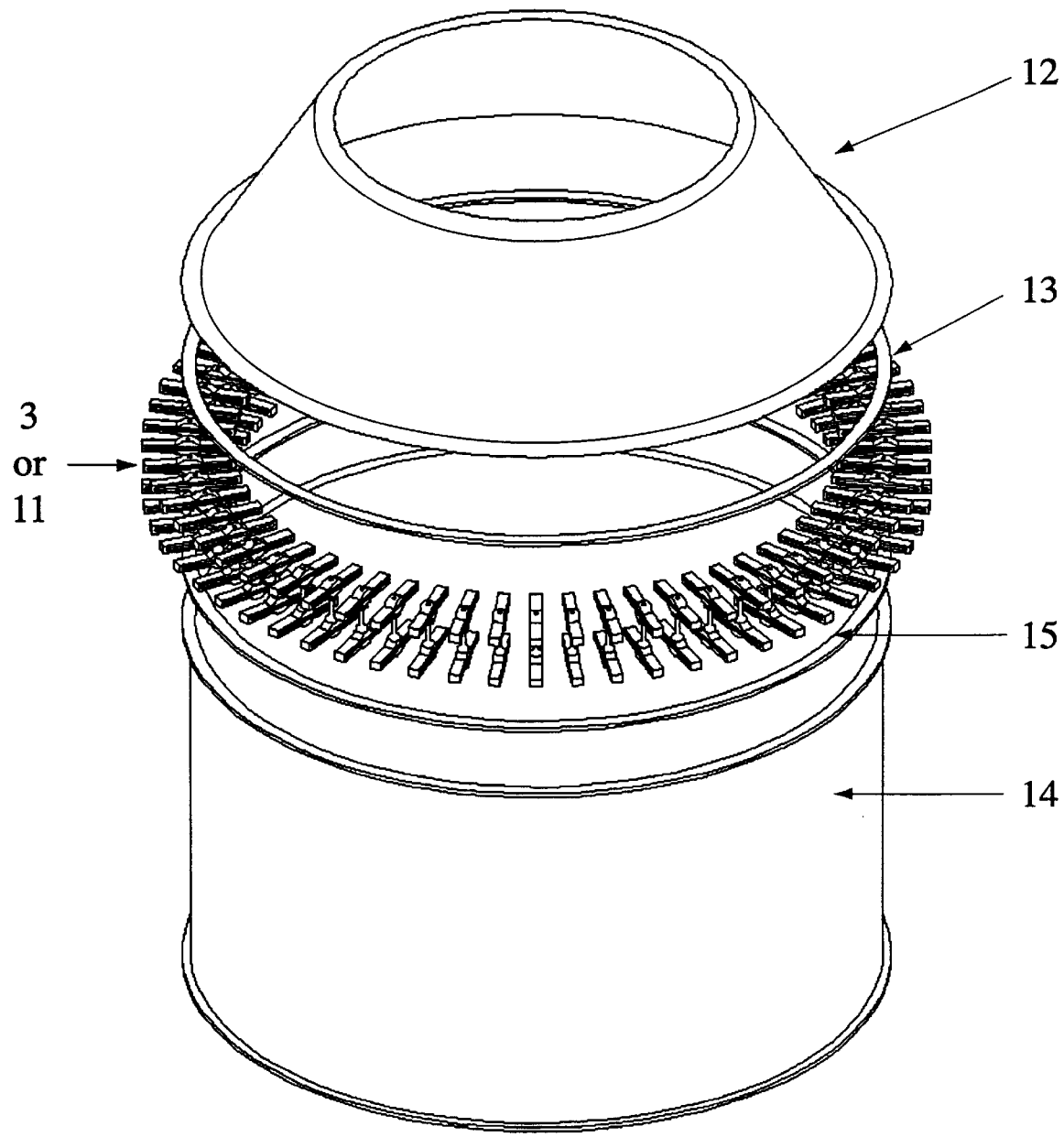
FIG. 5 is a view of a three-axis whole-spacecraft passive vibration isolation system employing multiple three-axis isolation devices.

The preferred embodiment of the invention utilizes two axial vibration isolation devices 1 of the dual-beam flexure type disclosed in application Ser. No. 08/980,790 and combines them with a stand-off post 2 as shown in FIG. 1 to create the three-axis vibration isolation device 3. The connection of the post 2 to the axial devices 1 is secured with pins 4, having a press fit. Axial isolation devices 1 are arranged parallel to one another, as shown in the orthogonal views of FIG. 2, so that the assembly remains compact and essentially planar, thus allowing for close spacing in a three-axis whole spacecraft vibration isolation system, as shown in FIG. 5.

Each of the two axial isolation devices 1, as shown in FIG. 1, consists of a titanium flexure 5, two titanium constraining layers 6, and two layers of viscoelastic material 7. The titanium flexure element 1 is machined from a single block of titanium material and is constructed such that it is symmetric with respect to three planes parallel to its edges.

Bosses 8 are machined in the flexure element 1 to a depth equal to at least seven thread turns of fastener bolts. The length, width, and height of the flexure beams 9 and the length of the stand-off post 2 govern the stiffnesses of the isolation device 3. Passive damping is introduced by applying a viscoelastic material 7 and a constraining layer 6 to the inside of the isolation element 1 on the flexure beams 9. The constraining layer 6 has a hole in its center to prevent entrapped air when the fastener bolt is engaged.

Figure 3:
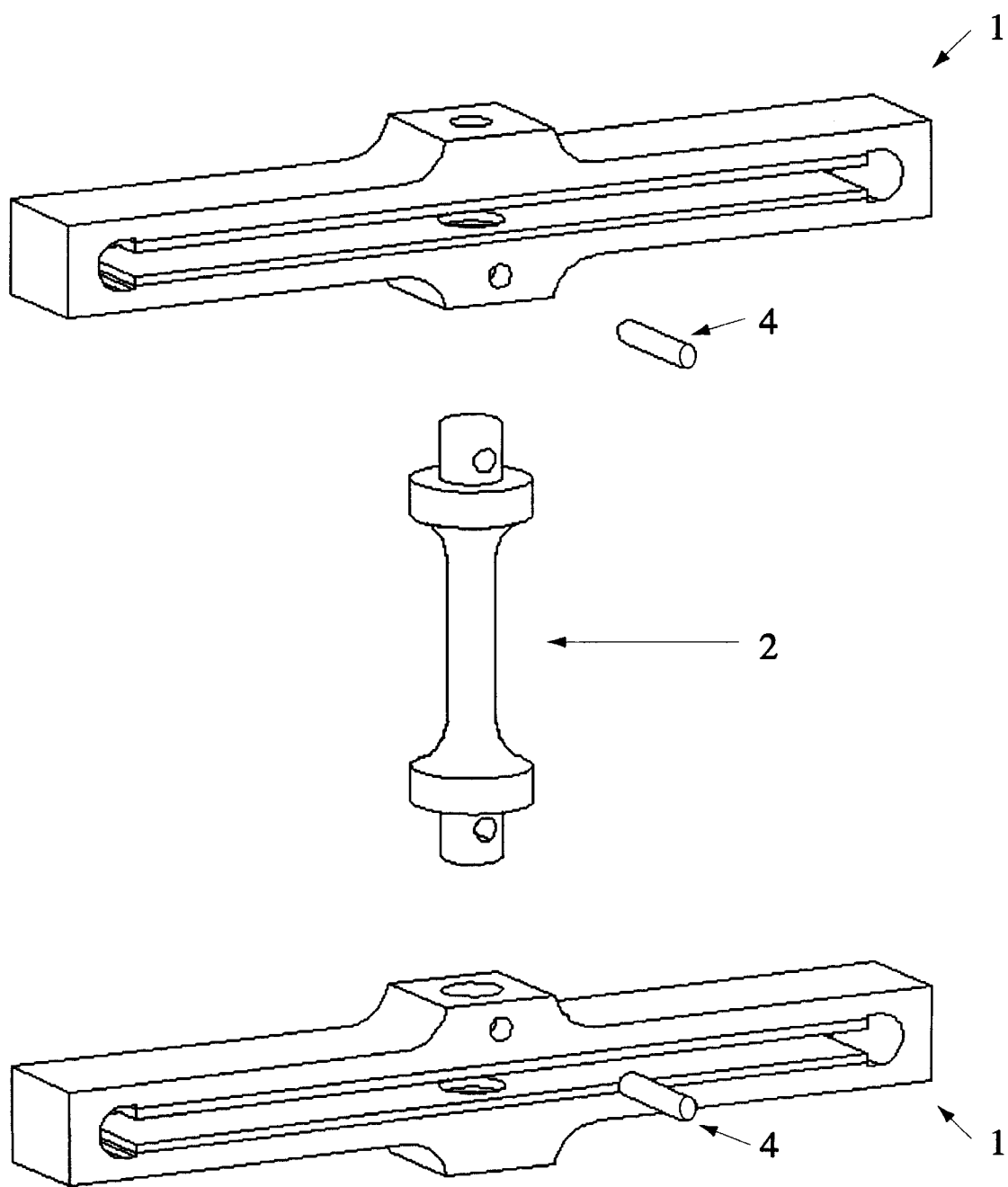
FIG. 3 is an exploded view of the three-axis vibration isolation device of FIG. 1.

FIG. 3 shows an exploded view of the three-axis device, where the post 2 and pins 4 are disconnected from the axial devices 1.

Figure 4:
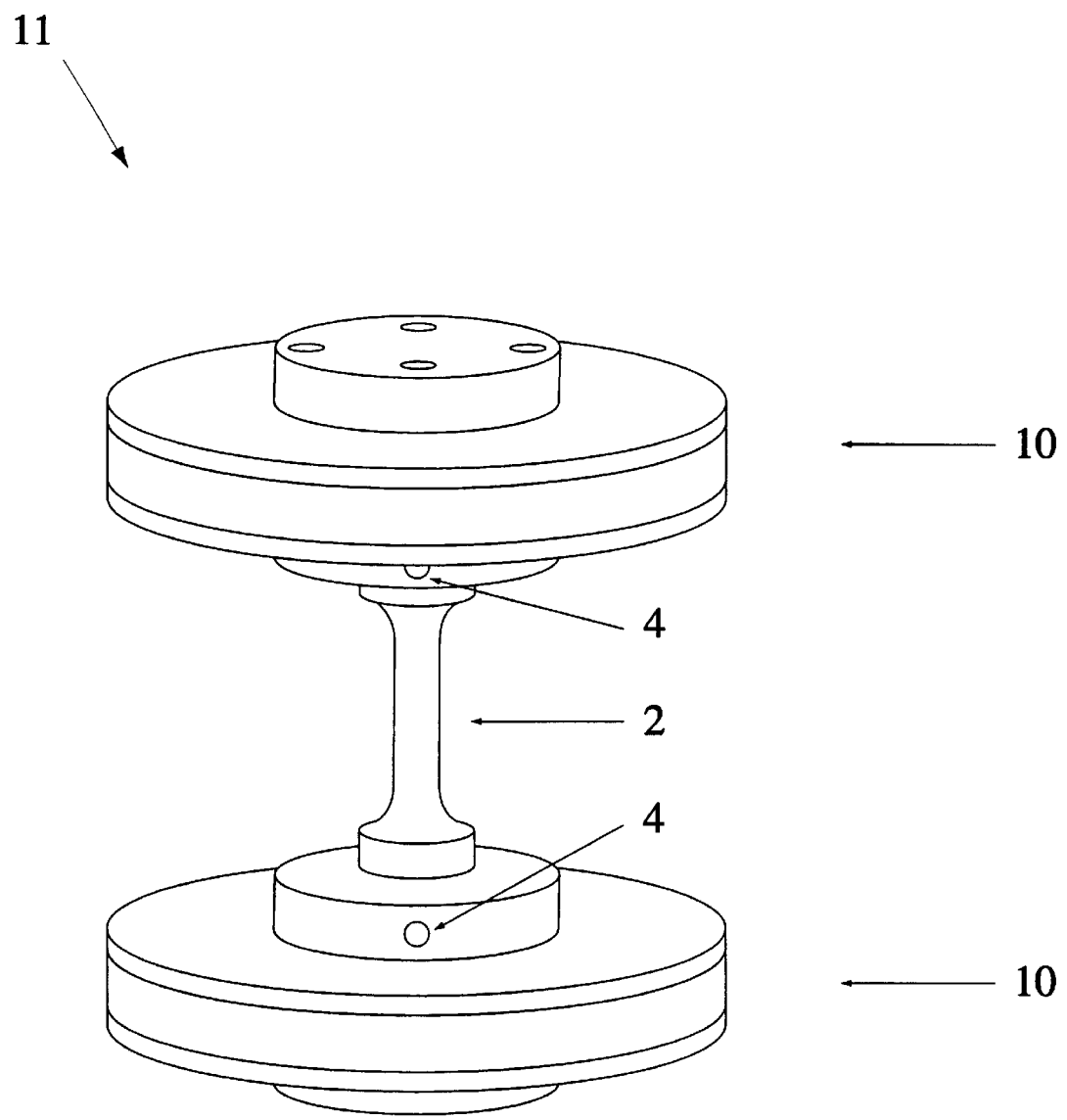
FIG. 4 is an isometric assembly view of the three-axis vibration isolation device utilizing the dual-disk type axial vibration isolation device.

FIG. 4 shows an alternative form of the three-axis vibration isolation device, wherein two of the dual-disk type axial devices 10 of application Ser. No. 08/980,790 are combined with stand-off post 2 and pins 4 to create a three-axis vibration isolation device 11.

FIG. 5 shows implementation of the three-axis isolation device 3 (or 11) into a three-axis whole-spacecraft isolation system. Spacecraft separation system 12 with ring flange 13 is supported by multiple three-axis isolation devices 3 to launch vehicle adapter structure 14 and ring flange 15. As stated previously, this preferred embodiment of device 3 is shown in FIG. 5, thus allowing close spacing of devices 3 between and around ring flanges 13 and 15.

While the invention has been described with reference to specific embodiments, modifications and variations of the invention may be constructed without departing from the scope of the invention, which is defined in the following claims.

We claim:

1. A three-axis vibration isolation device comprising:
   two single-axis vibration isolation devices each having two mounts,
   and a stand-off element comprising,
      a post of high strength material,
      and attachments at each end of the high strength post compatible with the mounts of the single-axis vibration isolation devices,
   wherein at each end of the stand-off element, the stand-off element connects to one of the mounts on one of the single-axis vibration isolation devices, thereby connecting the two single-axis devices to form a single three-axis vibration isolation device.

2. The device of claim 1, wherein the single-axis vibration isolation devices are dual-beam flexure devices.

3. The device of claim 1, wherein the post is of circular cross section.

4. The device of claim 1, wherein the stand-off element attachments are press fit cylindrical studs with locking pins.

5. The device of claim 1, wherein the single-axis vibration isolation devices are circular disk flexure devices.

6. The device of claim 1, wherein plural devices of claim 1 comprise a three-axis, six degree-of-freedom, passive, vibration isolation, payload mounting apparatus, wherein the device of claim 1 is utilized at each of the retained mounting locations between the payload and its vehicle.

7. A three-axis, six degree-of-freedom, whole-spacecraft passive vibration isolation apparatus consisting of three or more devices of those claimed in claim 1, wherein a device is inserted in each retained mounting location between the spacecraft and the launch vehicle adapter structure.

8. A three-axis vibration isolation apparatus comprising two single-axis vibration isolation devices, each single-axis device having two spaced flexible beams joined at outer ends thereof by flexures, and having inward and outward facing mounts in middles of the beams for mounting the device, and a stand-off element comprising a post of high strength material and attachments at each end of the high strength post compatible with the inward facing mounts of the single-axis vibration isolation devices, wherein at each end of the stand-off element, the stand-off element connects to one of the mounts on one of the single-axis vibration isolation devices, thereby connecting the two single-axis devices to form a single three-axis vibration isolation assembly, and wherein the outward facing mounts attach to ring flanges of structures to be isolated.

9. The device of claim 8, wherein the single-axis vibration isolation devices are dual-beam flexure devices, and further comprising a viscoelastic material on inward facing spaced surfaces of the beams and constraining layers secured to inward faces of the viscoelastic material.

10. The apparatus of claim 8, wherein the post is of circular cross section.

11. The apparatus of claim 8, wherein the stand-off element attachments are press fit cylindrical studs extending into mounting holes in the mounts with locking pins extending transversely through holes in the studs and through the mounts.

12. The apparatus of claim 8, wherein the single-axis vibration isolation devices are circular disk flexure devices, wherein the beams comprise circular disks with circular peripheries at outer ends thereof, and wherein the flexures comprise cylindrical flexures joining the circular peripheries of the disks.

13. The apparatus of claim 8, further comprising a vehicle and a payload, and wherein the devices and stand-off elements comprise three-axis, six degrees-of-freedom, passive, vibration isolation, payload mounting assemblies, and wherein the devices and stand-off elements are used at each retained mounting locations between the payload and the vehicle.

14. The apparatus of claim 13, wherein the three-axis, six degree-of-freedom assemblies comprise a whole-spacecraft passive vibration isolation apparatus, further comprising three or more of the assemblies, wherein an assembly is inserted in each retained mounting location between the spacecraft and the launch vehicle adapter structure.

15. A three-axis vibration isolation method comprising two single-axis vibration isolation devices, each single-axis device having two spaced flexible beams joined at outer ends thereof by flexures, and having inward and outward facing mounts in middles of the beams for mounting the device, connecting the inward facing mounts, and a stand-off element comprising a post of high strength material and attachments at ends of the high strength post compatible with the inward facing mounts of the single-axis vibration isolation devices, wherein the connecting comprises attaching an attachment at each end of the stand-off element, an inner mount on one of the single-axis vibration isolation devices, thereby connecting the two single-axis devices to form a single three-axis vibration isolation assembly, and wherein the outward facing mounts attach to ring flanges of structures to be isolated.

16. The device of claim 15, further comprising constructing of a single element the single-axis vibration isolation devices of the dual-beam flexure type, and further comprising coating a viscoelastic material on inward facing spaced surfaces of the beams and securing constraining layers to inward faces of the viscoelastic material.

17. The method of claim 15, wherein the post is of circular cross section.

18. The device of claim 1, wherein the stand-off element attachments are cylindrical studs, and wherein the connecting comprises press fitting the cylindrical studs into mounting holes in the mounts and extending locking pins transversely through aligned holes in the studs and transverse holes in the mounts.

19. The method of claim 15, wherein the providing comprises providing single-axis vibration isolation devices circular disk flexure devises, wherein the beams comprise circular disks with circular peripherals at outer ends thereof, and wherein the flexures comprise cylindrical flexures joining the circular peripherals of the disks.

20. The method of claim 15, further comprising providing a vehicle and a payload, wherein providing the devices and stand-off elements comprises three-axis, six degree-of-freedom, passive, vibration isolation, payload mounting assemblies comprises the assemblies of the devices and stand-off elements are used at each retained mounting locations between the payload and the vehicle.

21. The method of claim 13, wherein the three-axis, six degree-of-freedom assemblies comprise a whole-spacecraft passive vibration isolation apparatus, further comprising three or more of the assemblies and inserting an assembly in each retained mounting location between the spacecraft and the launch vehicle adapter structure.

* * * * *